United States Patent [19]

Drake et al.

[11] Patent Number: 4,703,919

[45] Date of Patent: Nov. 3, 1987

[54] PRINTER STAND

[75] Inventors: Craig D. Drake; Ross A. Jessen, both of Muscatine, Iowa

[73] Assignee: Ring King Visibles, Inc., Muscatine, Iowa

[21] Appl. No.: 763,911

[22] Filed: Aug. 8, 1985

[51] Int. Cl.[4] .............................................. F16M 11/38

[52] U.S. Cl. ...................................... 248/677; 248/172

[58] Field of Search ............... 248/432, 677, 678, 675, 248/670, 172, 165; D6/449, 466, 473, 2-44; 312/208; 400/691

[56] References Cited

U.S. PATENT DOCUMENTS

| | | | |
|---|---|---|---|
| 1,471,931 | 10/1923 | Trout | 248/172 |
| 2,578,564 | 12/1951 | Love et al. | 248/172 X |
| 3,499,382 | 3/1970 | Potter et al. | 400/691 X |
| 4,331,312 | 5/1982 | LaVoe | 248/165 X |

OTHER PUBLICATIONS

Marvel Co. *Catalog,* 1984.

*Global Computer Supplies* Catalog, p. 18, Copyright 1983.

*Inmac* Catalog, pp. 6,7, Feb. 1984.

Inland Printer Stand LCS#0513-14, shown at page 35 of Spring/Summer 1985 Catalog of Lyben Computer Systems.

Kensington Microware Universal Printer/Portable Computer Stand advertisement, copyright 1984.

Ring King Up-Write Printer Stands Model PS1215-SMK, shown in undated brochure.

Ring King Model AC0080 Printer Stand, shown in undated brochure.

*Primary Examiner*—Ramon O. Ramirez

*Assistant Examiner*—Blair M. Johnson

*Attorney, Agent, or Firm*—Neuman, Williams, Anderson & Olson

[57] ABSTRACT

A printer stand comprising spaced right and left supports. Each support is a unitary plastic molding which includes an elongated wide support member having a flat upper support surface. Central and rear paper passageway notches are open at the inner edge of the member and a reinforcing rib extends along the underside of the member and across the notches. Leg means support the member above a base surface on which the stand rests, for storage of paper beneath the printer and feeding of that paper into the printer through one or more of the notches in the support members. Pads are provided on the support surfaces to cushion the printer.

6 Claims, 6 Drawing Figures

PRINTER STAND

BACKGROUND OF THE INVENTION

1. Field of the Invention

The present invention relates to stands for printers and, more particularly, to improved stands which accomodate a wide variety of printers while allowing paper storage underneath the printer and feeding of that paper to such variety of printers.

2. Description of the Prior Art

A variety of printer stands and support devices have been developed in which a peripheral printer is supported above a support surface to permit storage of a supply of printer paper under the printer. The stand also may position the printer at a particular selected angle to the support surface. Typically, the stands are constructed of metal and rubber padding or of molded plastic. The supply of paper normally is a continuous accordion-folded strip with appropriate feeder strips along the edges and cross-perforations for sheet separation after printing, as desired.

Due to the diversity of designs and sizes of the printers which are or will become available, there is a need for a printer stand which is able to accommodate a variety of shapes and sizes of printers with paper feed openings in various positions. Varying widths of printers require stands which insure support capability at a wide range of locations. Further, the varying locations of paper feed openings among types of printers requires alteration of printer stand structure to allow paper feed and yet maintain an adequate support structure. For example, some printers require a bottom paper feed while other printers require a rear paper feed; some require a feed which is centered laterally of the printer while others require a feed which is offset toward one edge or the other; and some have a paper feed very near one or both lateral edges while others are spaced from both edges.

Some prior art stands which have attempted to meet these various needs have utilized metal rod structures. However, such stands do not provide a paper guiding means or readily accommodate a variety of printers. Other prior art stands constructed of plastic are of fixed dimension. This further limits their versatility and ability to accommodate varying printers.

The printer stand of the present invention provides flexibility and universality by being capable of handling both rear and bottom feed printers and a variety of designs and sizes of printers.

OBJECTS OF THE INVENTION

It is an object of this invention to provide an improved printer stand, and particularly to provide a stand which meets the aforenoted needs.

It is a specific object of this invention to provide a printer stand which accommodates a wide variety of printers.

It is a further object of this invention to provide an improved printer stand that avoids the disadvantages and complexities of the prior art.

It is another object of this invention to provide a printer stand which meets the aforestated objects and which minimizes the expense of manufacture.

It is another object of this invention to provide a printer stand which is capable of handling both bottom-feed and rear-feed printers and a variety of widths of printers with feeds in various lateral positions.

Other objects, advantages and features of the present invention will become apparent upon reading the following detailed description and appended claims, and upon reference to the accompanying drawings.

SUMMARY OF THE INVENTION

In accordance with one embodiment of this invention, a printer stand which achieves the foregoing objects includes spaced right and left supports. Each support includes an elongated support member having a wide, flat upper support surface. The support member is formed with a first paper passageway notch which is open at the inner edge of the member and a reinforcing rib which extends along the underside of the member and across the notch. Each member also includes leg means to support the member above a base surface on which the stand rests, for storage of paper beneath the printer and feeding of that paper into the printer through one or more of the notches in the support members. Pads are provided on the support surfaces to cushion the printer, as the usual feet of some printers may fall between the spaced supports and the printer housing thereby may rest directly on the support members. Foot pads are also provided at the bottom of each leg to give general support and to help isolate vibrations.

BRIEF DESCRIPTION OF THE DRAWINGS

For a more complete understanding of this invention, one should refer to the preferred embodiment illustrated in greater detail in the accompanying drawings and described below by way of an example of the invention. In the drawings.

DETAILED DESCRIPTION OF THE DRAWINGS

Figure 3:
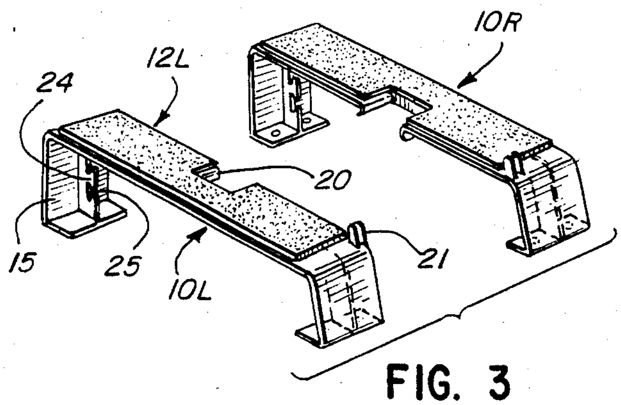
FIG. 3 is a perspective view of a stand consisting of right and left-hand supports corresponding to the support of FIG. 1, illustrating their relative positioning as a printer stand and showing the location of the cushion pads.
Figure 4:
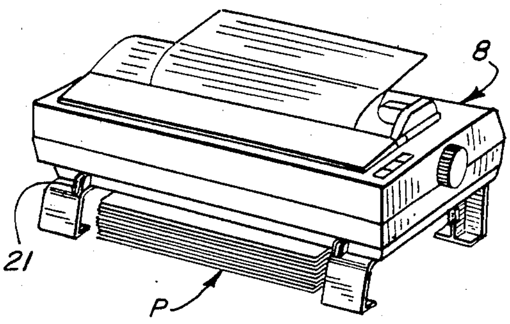
FIG. 4 is a perspective view of the preferred embodiment of the present invention supporting a printer and illustrating the location of the printer and paper.

Turning now to the drawings, FIG. 3 shows a pair of left and right hand supports 10L and 10R arranged to provide a stand for supporting a printer 8 as in FIG. 4. The two supports 10L and 10R are mirror images of one another and otherwise are of identical construction to one another. Accordingly, only one such support will be described in detail, and the same numbers are applied to like components of each throughout the drawing and the following description.

Figure 1:
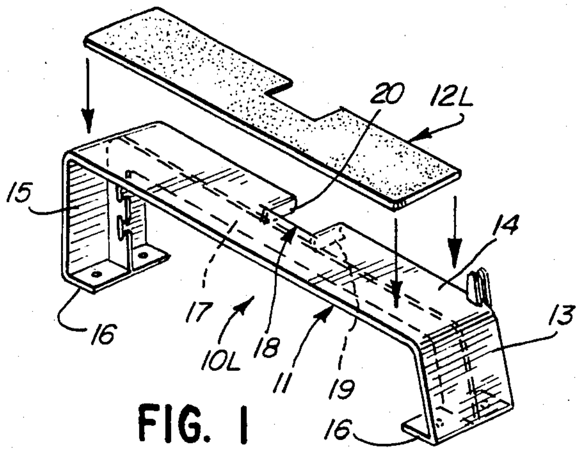
FIG. 1 is a perspective view of the left-hand portion or support of a stand employing the teachings of this invention and illustrating the location and addition of the cushion pad.
Figure 5:
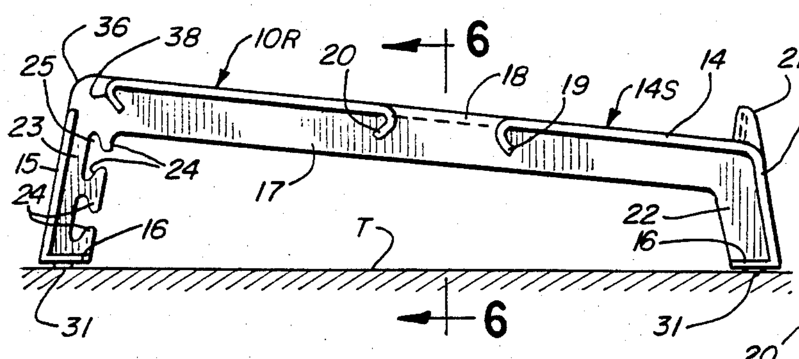
FIG. 5 is an inner side view of the right-hand support of FIG. 3 illustrating the interior flanges.
Figure 6:
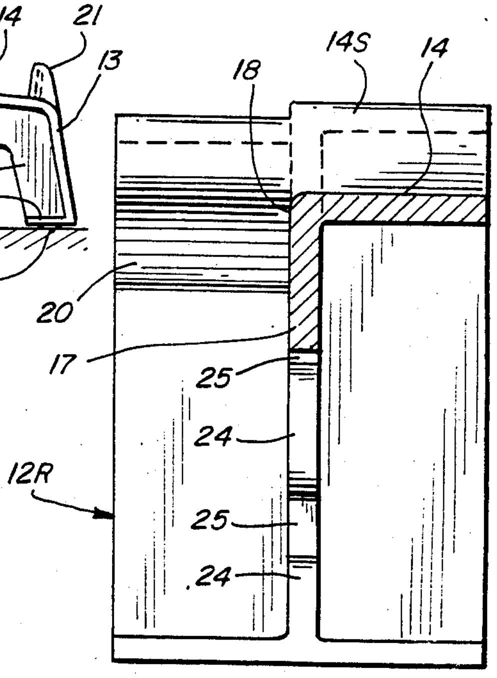
FIG. 6 is a sectional view taken along line 6—6 in FIG. 5.

FIG. 1 shows the left-hand support of a printer stand generally at 10L. The support 10L comprises a unitary, molded plastic support 11 and a cushion pad 12L. The support 11 includes a front leg 13, an elongated, thin, wide, flat, top support member 14, and rear leg 15. As best seen in FIG. 5, the two legs 13 and 15 extend downward from the support member in diverging relationship to one another, thereby insuring adequate open area for storage of printing paper as shown in FIG. 4. Each leg is integral with the respective end of member 14 and includes an integral foot portion 16.

A center reinforcement rib 17 extends longitudinally along the entire underside of the portion 14 and provides structural support therefor. A first paper passageway notch 18 is formed through the upper support member 14, extending from the inner edge to the rib 17. The notch 18 is located in the central portion of member 14. It is defined by forward and rearward lateral edges, with reinforcement flanges 19 and 20 extending along these edges to provide structural reinforcement support of the portion 14 at the notch. Each of the reinforcement flanges 19,20 is integral with the center reinforcement rib 17 and with the support member 14 along the respective edge, as best seen in FIG. 5. Each of these flanges is curved downward and outward relative to the notch 18 and is of uniform depth from the upper support surface 14S of member 14 to the lower edge of the flange, i.e., the lower edges are generally horizontal, parallel to the upper surface 14S and to the subjacent support surface T (FIG. 5), to insure uniform guidance of printing paper P (FIG. 4) and avoid curling of the paper as it slides over these flanges. Since the rib 17 spans the notch 18 longitudinally, the rib insures structural beam support integrity for the support member 14. The reinforcement flanges 19 and 20 provide support for the segments of member 14 which extend laterally inward from the rib and which are traversed by notch 18 and thereby severed from one another.

The support member 14 is also integral with the legs 13 and 15. An upright stop member 21 is provided near the front edge of upper support surface 14S of each support 11 to retain a printer on the stand. It is preferable to have stop member 21 located along the inner edge of each member 11, as shown. The stop member 21 serves as a retainer stop for the printer 8 as shown in FIG. 4.

Figure 2:
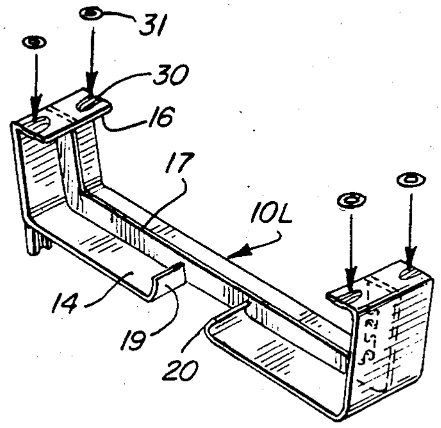
FIG. 2 is a perspective view of the bottom side of the support of FIG. 1 and illustrating the location and addition of the foot pads.

FIGS. 2 and 5 best show the substructure of a member 11 of the printer stand, specifically the left-hand member 11L. This view shows the center reinforcement rib 17 in greater detail. The rib extends continuously along the entire length of the member 11. A reinforcement flange portion 22, 23 of each leg 13, 15 is an integral continuation of the rib 17.

The rear leg flange 23 is further comprised of a means for managing a power or MODEM cord. Ihis means, in the preferred embodiment, constitutes hook portions 24 and corresponding C-shaped recesses 25 defined in the flange 23. A power cord and/or MODEM cable (not shown) can be C-wrapped around the hooks 24 and through the recesses 25 in order to be neatly stowed and kept away from the paper and printer.

Each cushion pad 12L, 12R has a formed notch 26 which corresponds to the first paper passageway notch 18 of the respective support member 11. The cushion pads may be attached to the support members by any suitable means, such as adhesive. The pads 12 assist in cushioning a printer against transmission of vibrations and are particularly advantageous when the stand is used to support printers (not shown) having legs which fall between the support members. In such instances the printer housing will be cushioned on the pads 12 rather than resting directly on the support members 14. The pads also provide frictional engagement to prevent shifting of the printer on the stand.

On the underside of the feet 16 are recesses 30. The recesses are located for the addition of cushioning foot pads 31. Four foot pads are shown for each member of the printer stand. The foot pads further assist in isolating vibrations and provide gripping to avoid shifting of the stand on a support surface, e.g. surface T in FIG. 5.

As perhaps best seen in FIGS. 2 and 5, a second paper passageway notch 36 is provided at the rear end of member 14 where it joins rear leg 15. The front edge of notch 36 is defined by a curved reinforcement flange 38 similar to flanges 19 and 20. This flange also is integral with member 14 and rib 17 for reinforcing the severed rear inner segment of member 14, and also has a horizontal lower edge for smooth guiding of paper. This second paper passageway notch 36 also extends from the inner edge of member 14 to the rib 17.

The notches 36 provide unobstructed paths for the paper P as it is fed to a rear fed printer. The notches 18 similarly provide unobstructed feed paths for the paper as it is fed to a bottom fed printer.

The supports may be fabricated in various manners. However, a single unitary molding of plastic as illustrated is preferred for simple and inexpensive manufacture of a stand with adequate strength for supporting typical printers. In one illustrative example, stands 11 have been molded of a crystal polystyrene plastic with members 14 about 2½" wide, 3/16" thick and 15" long, and with a reinforcement rib 17 about ¾" deep and 3/16" thick. The ribs 17 were centered and notches 18, 36 were about 1" deep. Reinforcement flanges 19, 20, 38 were about ½" deep.

FIG. 3 shows both right-hand and left-hand members 10R, 10L of the printer stand positioned for supporting a printer. FIG. 4 shows the use of the printer stand in its preferred embodiment. A stack of paper P is located beneath the printer 8, between the supports 10L, 10R. The printer rests against stop members 21 which prevent the printer from sliding off of the supports. Paper P is fed through the stand at either the first paper passageway notches 18 or second paper passageway notches 36, as appropriate to the particular printer. By virtue of the use of two movable supports 10 with wide support surfaces and the inner edge feed passage notches, a wide variety of printers can be accommodated. The supports can be extended beneath each lateral edge of a printer to engage the printer's feet or housing at points out-board of, in line with or even in-board of the outer edge of the paper feed opening in the printer. The notches 18, 36 thus span the paper feed path. This permits free passage of the paper regardless of the location of the printer's feed opening and thus of the paper feed path relative to the points of ergagement on the support stand.

The printer stand is shown with th.e front legs 13 shorter than the rear legs to dispose support members 14 and hence the printer 8 at a preferred slightly forward-tilt angle, although the invention is not restricted to any particular angle.

The hooks 24 and recesses 25 of one support may be utilized for managing a power cord while those of the other are utilized to manage a MODEM cable, as noted above. Each may be drawn through a recess 25 around hook 24 by pressing against the insides of the hooks. The cord or cable is then drawn out through the opposite recess 25.

Thus, a printer stand has been provided which meets the aforestated objects. The stand has broad supports with paper passage notches to accommodate a wide variety of printers. First and second paper passageway notches are provided for both bottom and rear feeding printers. It has a simplified construction. Preferably it is formed from a unitary plastic molding, which minimizes the expense of manufacture. A cord management system is provided which controls the location of power cords.

While one preferred embodiment of the invention is illustrated, it will be understood, of course, that the invention is not limited to this embodiment. Those skilled in the art to which the invention pertains may make modifications and other embodiments employing the principles of this invention, particularly upon considering the foregoing teachings.

What is claimed is:

1. A stand for supporting a portable printer stand or the like comprising separate spaced cooperative right and left supports each including an elongated support member of unitary molded plastic construction and defining a wide flat upper support surface having spaced inner and outer longitudinal edges and having an inner edge disposed toward the other of said supports, each of said support members having a first paper passageway notch therethrough which is open at the inner edge of said member, leg means comprising a leg integral with and depending from each end of said member for supporting said member above a base surface on which said stand is rested, said member including a depending reinforcement rib extending longitudinally along the underside of said member from one of said legs to the other of said legs and being integral with each of said legs, said rib being located approximately midway between said edges and traversing said notch, said notch extending from said rib to said inner edge of the respective member, whereby printing paper may be stored beneath a printer supported on said stand and fed into such printer through said notch of one or both of said supports.

2. A stand as in claim 1 wherein at least one of said legs of each of said supports includes a leg reinforcement flange integral with said reinforcement rib and said leg reinforcement flange defining slot means for holding power cords, said slot means comprising hook portions and C-shaped recesses.

3. A stand as in claim 1 wherein each of said notches is defined in part by forward and rearward lateral edges of said member and a depending reinforcement flange extending along each such forward and rearward lateral edge, each of said reinforcement flanges being integral with said reinforcement rib.

4. A stand as in claim 1 wherein said support member includes a cushion pad extending over the upper support surface.

5. A stand as in claim 1 including means beneath said support member for managing power cords.

6. A stand as in claim 1 wherein said support member is formed with a second paper passageway notch therethrough which also is open at the inner edge of said member, said second notch being located in an end portion of said member and said first notch being located in the midportion of said elongated member.

* * * * *